(12) United States Patent
Nameki et al.

(10) Patent No.: US 9,889,870 B2
(45) Date of Patent: Feb. 13, 2018

(54) DRIVING CURVE CREATION DEVICE, DRIVING ASSISTANCE DEVICE, DRIVING CONTROL DEVICE, AND DRIVING CURVE CREATION METHOD

(71) Applicant: KABUSHIKI KAISHA TOSHIBA, Minato-ku, Tokyo (JP)

(72) Inventors: Hideaki Nameki, Mitaka Tokyo (JP); Yushi Kamo, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/108,270

(22) PCT Filed: Dec. 10, 2014

(86) PCT No.: PCT/JP2014/082699
§ 371 (c)(1),
(2) Date: Jun. 24, 2016

(87) PCT Pub. No.: WO2015/098521
PCT Pub. Date: Jul. 2, 2015

(65) Prior Publication Data
US 2016/0297456 A1    Oct. 13, 2016

(30) Foreign Application Priority Data
Dec. 26, 2013   (JP) .................................. 2013-270191

(51) Int. Cl.
*B61L 27/04*      (2006.01)
*B61L 3/00*       (2006.01)
*B61L 25/02*      (2006.01)

(52) U.S. Cl.
CPC .............. *B61L 27/04* (2013.01); *B61L 3/004* (2013.01); *B61L 3/006* (2013.01); *B61L 3/008* (2013.01);
(Continued)

(58) Field of Classification Search
CPC .................................................. B61L 2201/00
(Continued)

(56) References Cited

U.S. PATENT DOCUMENTS

| 4,566,067 A * | 1/1986 | Sahasrabudhe ......... B61L 3/008 |
| | | 701/117 |
| 5,211,080 A * | 5/1993 | Leising ............... F16H 61/0206 |
| | | 475/120 |

(Continued)

FOREIGN PATENT DOCUMENTS

| EP | 0539885 A2 | 5/1993 |
| EP | 0554983 A1 | 8/1993 |

(Continued)

OTHER PUBLICATIONS

International Search Report (ISR) including Written Opinion dated Mar. 3, 2015, issued in counterpart International Application No. PCT/JP2014/082699.
(Continued)

*Primary Examiner* — Atul Trivedi
(74) *Attorney, Agent, or Firm* — Holtz Holtz & Volek PC

(57) ABSTRACT

A running profile generation device includes a storage, a speed limit setter, a reverse coasting curve generator, a parameter setter and a simulator. The speed limit setter acquires at least one speed limit section of a running section set based on a departure point and an arrival point of the running section. The reverse coasting curve generator determines a base point from a terminal position and an upper limit speed of the speed limit section and generates a reverse coasting curve based on vehicle performance information and route information stored in the storage. The parameter setter determines a coasting start position from the generated reverse coasting curve. The reverse coasting curve generator sets a range below the upper limit speed as a coasting range and sets a range at at least the upper limit speed to the upper
(Continued)

limit speed during coasting from the base point toward the departure point.

6 Claims, 7 Drawing Sheets

(52) U.S. Cl.
 CPC .......... *B61L 25/021* (2013.01); *B61L 25/025* (2013.01); *B61L 2201/00* (2013.01)
(58) Field of Classification Search
 USPC .......................................................... 701/20
 See application file for complete search history.

(56) References Cited

U.S. PATENT DOCUMENTS

| | | | |
|---|---|---|---|
| 5,440,489 A | 8/1995 | Newman | |
| 6,364,434 B1* | 4/2002 | Sway-Tin | B60L 15/20 303/152 |
| 9,126,606 B2* | 9/2015 | Kuehs | B61J 3/02 |
| 9,233,696 B2* | 1/2016 | Kumar | B61L 3/006 |
| 2010/0262408 A1* | 10/2010 | Taguchi | B60W 50/0098 703/8 |
| 2012/0022737 A1* | 1/2012 | Kumazaki | B60K 6/365 701/22 |
| 2012/0065818 A1 | 3/2012 | Haaf | |
| 2012/0197500 A1* | 8/2012 | Sujan | B60W 50/0097 701/51 |
| 2012/0245770 A1* | 9/2012 | Yamamoto | B61L 27/0027 701/20 |
| 2013/0158838 A1* | 6/2013 | Yorke | B60W 10/06 701/103 |
| 2014/0288763 A1* | 9/2014 | Bennett | B62D 11/18 701/31.6 |
| 2015/0066260 A1* | 3/2015 | Butcher | B60L 15/2045 701/22 |
| 2015/0066261 A1* | 3/2015 | Cusumano | B60W 20/108 701/22 |

FOREIGN PATENT DOCUMENTS

| | | |
|---|---|---|
| JP | 06090508 A | 3/1994 |
| JP | 2703830 B2 | 1/1998 |
| JP | 2003235116 A | 8/2003 |
| JP | 3881302 B2 | 2/2007 |
| JP | 2013146166 A | 7/2013 |

OTHER PUBLICATIONS

Extended European Search Report (EESR) dated Jul. 25, 2017 issued in counterpart European Application No. 14873912.1.

* cited by examiner

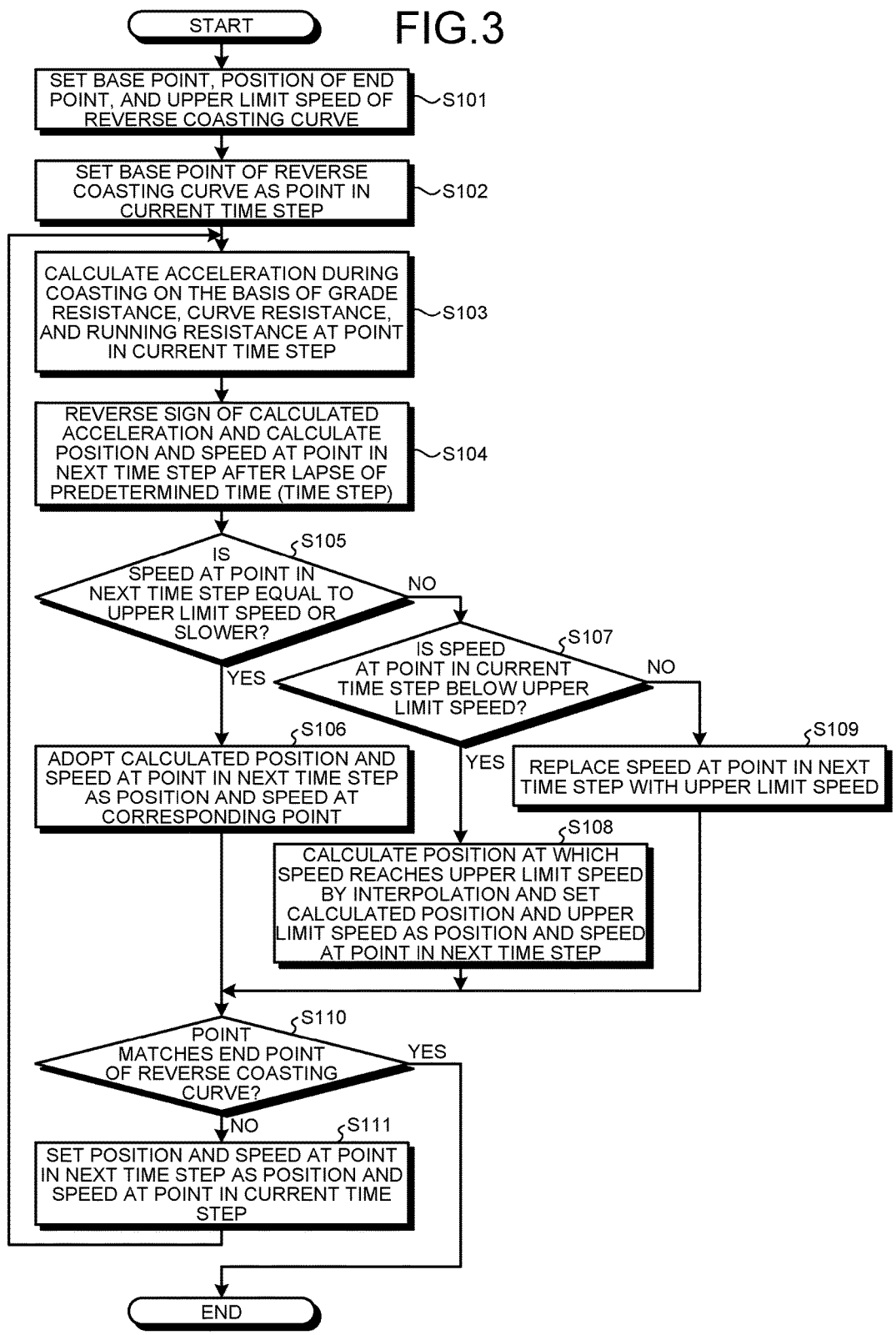

US 9,889,870 B2

DRIVING CURVE CREATION DEVICE, DRIVING ASSISTANCE DEVICE, DRIVING CONTROL DEVICE, AND DRIVING CURVE CREATION METHOD

FIELD

Embodiments described herein relate generally to a running profile generation device, an operation assistance device, an operation control device, and a running profile generation method.

BACKGROUND

There has been a known method for running trains with less energy consumption by generating running profiles employed to reduce the energy consumption with use of coasting while maintaining a running time.

In general, running profiles for a running train in a relatively short station interval have a pattern in which the train accelerates to a near maximum speed and shifts to coasting, and then applies brakes to decelerate when approaching a next station and come to a stop, or a pattern in which the train travels at a predetermined constant speed for a short period of time after accelerating and then applies brakes to decelerate when approaching a next station and come to a stop. In such a running pattern, it is possible to extend a coasting section according to a margin time set for a station interval, or replace with coasting, neighboring points around a changeover point between a constant speed and a deceleration or between an acceleration and a deceleration, namely a braking following power running, which leads to reducing the operation of a driving device to a minimum and reducing heat loss, and thus reducing the energy consumption.

Meanwhile, during a longer station interval, the distance that train travels at a constant speed increases, therefore, the train may apply brakes following power running in order to maintain the constant speed. On an upgrade, the train needs a driving force to maintain the speed whereas, on a steep downgrade, the train needs to apply the brakes because it accelerates without the driving force. Accordingly, when running through a grade change point at a constant speed, the train performs power running and braking successively. The energy consumption can also be reduced in the section in the middle of constant-speed running by appropriately replacing power running and braking with coasting.

However, there is no known method of determining at which timing the train starts coasting during constant-speed running.

A problem to be solved by the present invention is to provide a running profile generation device, an operation assistance device, an operation control device, and a running profile generation method which can easily insert a coasting section into a constant-speed running section and thereby reduce the energy consumption of running trains.

BRIEF DESCRIPTION OF DRAWINGS

FIG. 3 is an exemplary flowchart of a reverse coasting curve generation process according to the first embodiment;

DETAILED DESCRIPTION

According to an embodiment, a running profile generation device comprises a storage, a speed limit setter, a reverse coasting curve generator, a parameter setter and a simulator. The storage stores speed limit information, vehicle performance information, and route information. The speed limit setter acquires, from the storage, at least one speed limit section of a running section being set based on a departure point and an arrival point of the running section, the speed limit section being a section delimited at positions at which a speed limit changes. The reverse coasting curve generator determines a base point based on a terminal position and an upper limit speed of the speed limit section and generates a reverse coasting curve from the base point based on the vehicle performance information and the route information stored in the storage, the upper limit speed is set according to a speed limit for the speed limit section. The parameter setter determines a coasting start position based on the generated reverse coasting curve. The simulator generates a running profile by performing a running simulation based on the set running section, the speed limit information on the running section, the generated reverse coasting curve, the set coasting start position, and the vehicle performance information and the route information stored in the storage. The reverse coasting curve generator sets a range below the upper limit speed as a coasting range and sets a range equal to or above the upper limit speed to the upper limit speed during coasting from the base point toward the departure point.

First Embodiment

Figure 1:
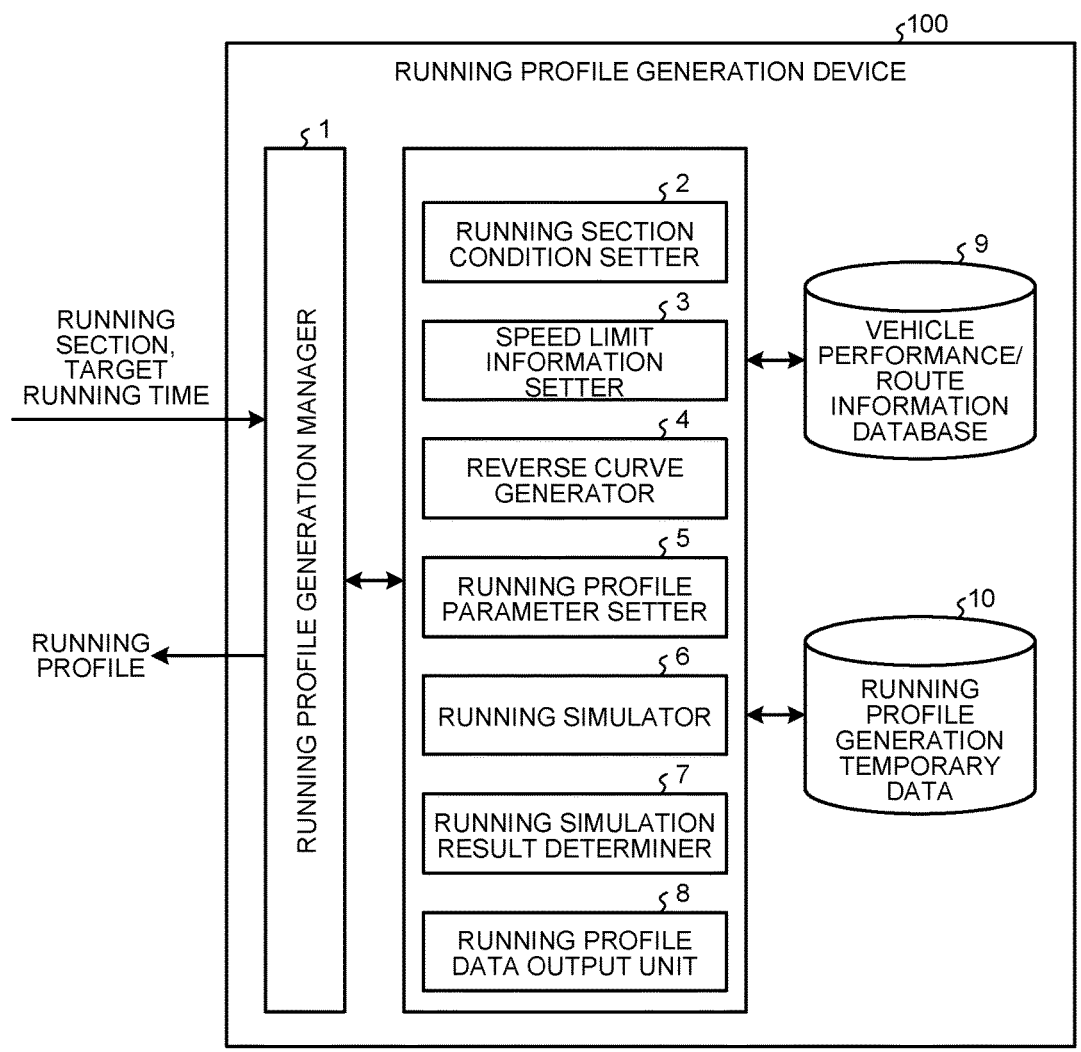
FIG. 1 is an exemplary block diagram illustrating an example of the configuration of a running profile generation device according to a first embodiment.

A first embodiment of a running profile generation device will now be described with reference to the accompanying drawings. FIG. 1 is a block diagram illustrating an example of the configuration of the running profile generation device according to the present embodiment.

As illustrated in FIG. 1, a running profile generation device 100 includes a running profile generation manager 1, a running section condition setter 2, a speed limit information setter 3, a reverse curve generator 4, a running profile parameter setter 5, a running simulator 6, a running simulation result determiner 7, a running profile data output unit 8, a vehicle performance and route information database 9 and running profile generation temporary data 10.

The running profile generation manager 1 controls the overall operations of the running section condition setter 2, the speed limit information setter 3, the reverse curve generator 4, the running profile parameter setter 5, the travel simulator 6, the travel simulation result determiner 7, and the running profile data output unit 8 according to their respective functions, and manages the generation of a running profile according to a predetermined procedure.

When the running profile generation device 100 is provided with information on a running section for which a running profile is to be generated and a target running time, namely information on stations of departure and arrival as well as an operation timetable, the running section condition setter 2 calculates a start position and an end position of the running section to be a running profile generation range as well as the target running time and sets them as conditions for generating the running profile. In the present embodiment, the running profile is generated for the running section set as above. Alternatively, the running start position, the running end position, and the target running time may be input directly to the running profile generation device 100. It may also be configured to input entire timetable information of an entire route from a starting station to a terminal station to the running profile generation device 100 and collectively compute a running profile for the entire route.

The speed limit information setter 3 extracts, from the vehicle performance and route information database 9, speed limit information on the running profile generation range set by the running section condition setter 2 and saves the information in the running profile generation temporary data 10. The speed limit information saved in the running profile generation temporary data 10 is used by the reverse curve generator 4 and the running simulator 6.

The reverse curve generator 4 refers to the speed limit information saved in the running profile generation temporary data 10 by the speed limit information setter 3 as well as vehicle performance data and route information data such as a grade that are saved in the vehicle performance and route information database 9, and generates a reverse deceleration curve, a reverse acceleration curve, and a reverse coasting curve. Data on each of the generated reverse curves (the reverse deceleration curve, reverse acceleration curve and reverse coasting curve) is saved in the running profile generation temporary data 10.

Figure 2A:
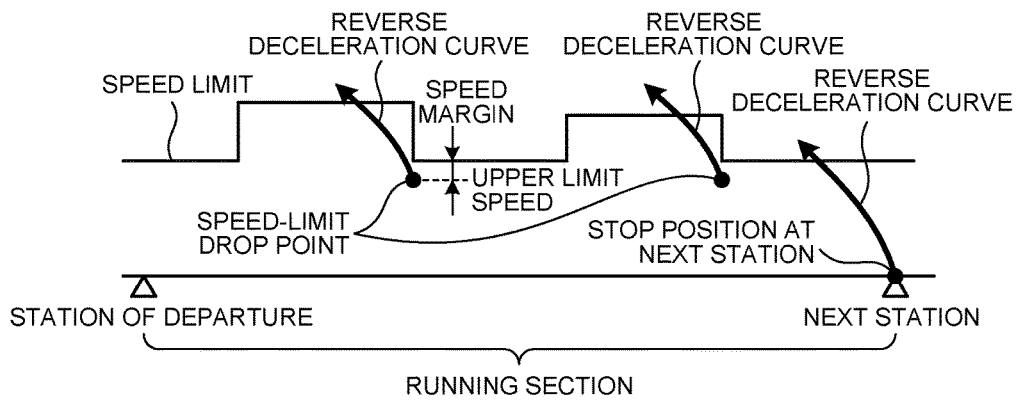
FIG. 2A is an exemplary diagram illustrating an example of how various reverse curves are generated according to the first embodiment.
Figure 2B:
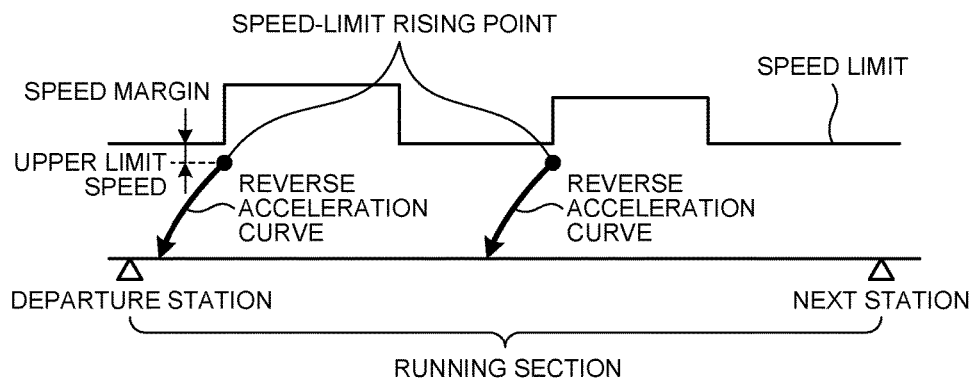
FIG. 2B is an exemplary diagram illustrating an example of how various reverse curves are generated according to the first embodiment.
Figure 2C:
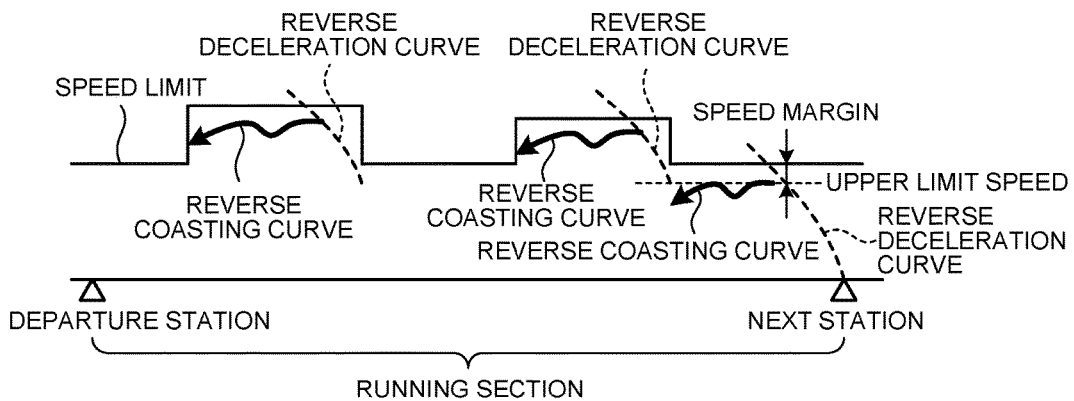
FIG. 2C is an exemplary diagram illustrating an example of how various reverse curves are generated according to the first embodiment.

FIGS. 2A to 2C illustrate examples of how each of the reverse curves is generated. FIG. 2A illustrates the reverse deceleration curve which is a speed curve during reverse deceleration relative to a travel direction from a base point being a speed-limit drop point and a stop position at a next station. FIG. 2B illustrates the reverse acceleration curve as a speed curve during reverse acceleration relative to the travel direction from a base point being a speed-limit rising point. The generated reverse deceleration curve and reverse acceleration curve are saved in the running profile generation temporary data 10 and used by the running simulator 6.

FIG. 2C illustrates the reverse coasting curve as a speed curve during reverse coasting relative to the travel direction from a base point at which the reverse deceleration curve reaches an upper limit speed which is arbitrarily set below the speed limit by a certain margin. Note, however, that the reverse coasting curve is subjected to correction as described later so as not to exceed the upper limit speed. The base point of the reverse coasting curve may also be set to a terminal of each speed limit section.

(Generation of Reverse Coasting Curve)

A method of generating the reverse coasting curve will now be described, referring to a flowchart in FIG. 3. FIG. 3 is a flowchart of the reverse coasting curve generation process.

First, the reverse curve generator 4 sets the base point, a position of an end point, and the upper limit speed of the reverse coasting curve on the basis of the running section set by the running section condition setter 2 and the speed limit information on the running profile generation range set by the speed limit information setter 3 (step S101). Note that the running section for which the reverse coasting curve is to be generated may include a section with a different speed limit. In this case, for each section (speed limit section), a base point (a position of a terminal of the speed limit section) and the upper limit speed thereat as well as a position of and the upper limit speed at an end point (a start position of the speed limit section) are set. The reverse coasting curve is then generated for each speed limit section as follows.

Figure 4A:
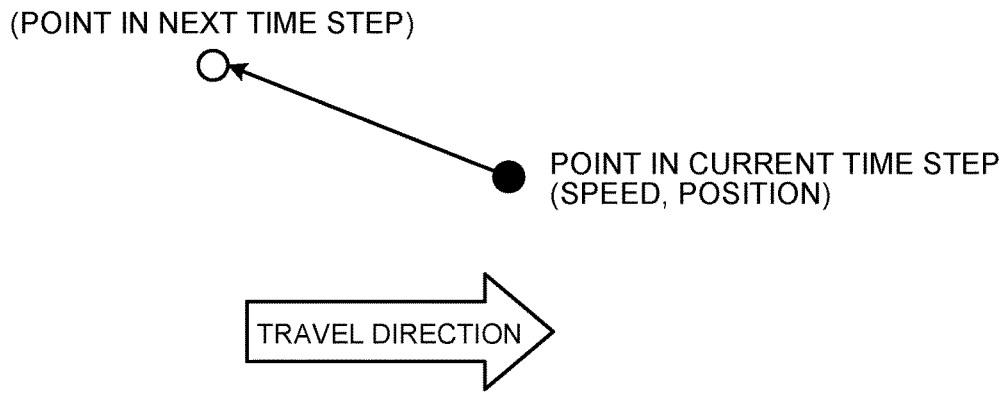
FIG. 4A is an exemplary diagram illustrating a method of generating the reverse coasting curve as FIG. 3.

Next, the reverse curve generator 4 sets the base point of the above reverse coasting curve set as a point in a current time step (step S102 and FIG. 4A).

The reverse curve generator 4 then calculates an acceleration at the time of coasting on the basis of grade resistance, curve resistance, and running resistance at the position of the point in the current time step (step S103).

After calculating the acceleration, the reverse curve generator 4 reverses the sign of the calculated acceleration and calculates a position and a speed at a point in a next time step after the lapse of a predetermined time (time step) (step S104).

When determining that the speed at the position of the point in the next time step equals or is below the upper limit speed (Yes in step S105), the reverse curve generator 4 adopts the result of calculation in step S104 as the position and speed at the point in the next time step (step S106).

When determining that the speed at the position of the point in the next time step exceeds the upper limit speed (No in step S105), the reverse curve generator 4 further determines whether or not the speed at the point in the current time step is below the upper limit speed (step S107).

Figure 4B:
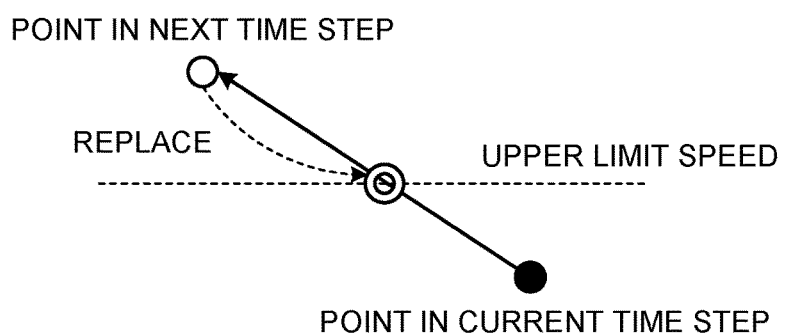
FIG. 4B is an exemplary diagram illustrating a method of generating the reverse coasting curve as FIG. 3.

When determining that the speed at the point in the current time step is below the upper speed limit (Yes in step S107), the reverse curve generator 4 calculates a position at which the speed reaches the upper limit speed by interpolation between the position and speed at the point in the next time step and the position and speed at the point in the current time step, sets the calculated position at which the speed reaches the upper limit speed as the position of the point in the next time step, and sets the speed at the point in the next time step as the upper limit speed (step S108 and FIG. 4B).

Figure 4C:
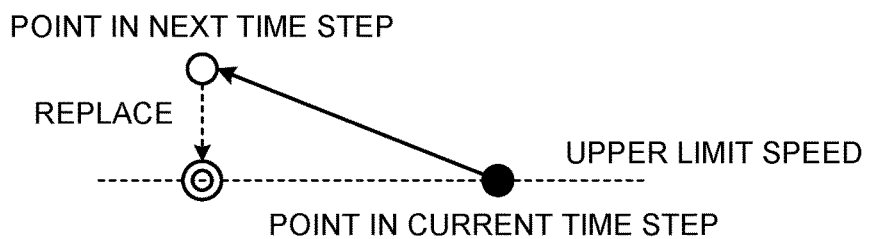
FIG. 4C is a diagram illustrating a method of generating the reverse coasting curve as FIG. 3.

When determining that the speed at the point in the current time step equals or exceeds the upper limit speed (No in step S107), the reverse curve generator 4 replaces the speed at the point in the next time step (speed exceeding the upper limit speed) with the upper limit speed (step S109 and FIG. 4C). Note that the position of the point in the next time step is the position calculated in step S104.

The reverse curve generator 4 ends the series of processing upon determining that the point in the next time step found as described above matches the end point of the reverse coasting curve (Yes in step S110).

Otherwise, the reverse curve generator 4 sets the position and speed at the point in the next time step that are found as described above as the position and speed at the point in the current time step (step S111), returns to step S103, and further executes the steps onward.

When the running section as a subject of the reverse coasting curve generation includes the section with a different speed limit, after determining "Yes" in step S110, the reverse curve generator 4 executes the processing to a succeeding speed limit section from step S101 onward, to generate the reverse coasting curve for the entire running section.

Here, a specific example of the method of generating the reverse coasting curve will be further described with reference to FIG. 5.

As described above, the reverse coasting curve is generated by performing a simulation (reverse coasting simulation) by a predetermined time increment reversely to the travel direction. FIG. 5 assumes a situation where, a grade is upward at a base point (p0), the acceleration during coasting is negative with the running resistance factored in, and the speed decreases in the travel direction during coasting. In the reverse coasting simulation, the speed of a train in a next time step (after the predetermined time increment) increases to a value (value at a point p1) higher than the upper limit speed. In the reverse coasting curve generation of the present embodiment, the position in the next time step is corrected to a point (p2) corresponding to the upper limit speed in order to prevent the train from exceeding the upper limit speed. The point p2 will be at a position that the train reaches after traveling at the upper limit speed reversely to the travel direction for the predetermined time increment from the base point (p0).

The point p2 becomes the starting point in the next time step. At the position of the point p2 as well, the acceleration is assumed to be negative due to the grade and the running resistance. In the reverse coasting simulation, the speed of the train exceeds the upper limit speed (p3). Thus, in order to prevent the train from exceeding the upper limit speed, the position in a next time step is corrected to a point (p4) matching the upper limit speed. The point p4 corresponds to a position that the train reaches after traveling at the upper limit speed reversely to the travel direction for the predetermined time increment from the position of the point p2.

At the position of the point p4, the acceleration is assumed to be zero since the grade is balanced with the running resistance. In this case, the speed after the predetermined time increment equals the upper limit speed and remains thereat, whereby a value obtained by the reverse coasting simulation (a value at a point p5) is adopted without change. The point p5 corresponds to a position that the train reaches after traveling at the upper limit speed reversely to the travel direction for the predetermined time increment from the position of the point p4.

The position of the point p5 is assumed to be on a downgrade. In this case, the train accelerates in the travel direction since the acceleration with the running resistance is positive in the travel direction. In the reverse coasting simulation, on the other hand, the speed of the train decreases to reach the speed and position at a point p6 in a next time step. A result of the reverse coasting simulation is thus adopted as it is when the speed of the train in the reverse coasting simulation equals or is below the upper limit speed.

When a succeeding reverse coasting simulation results in speeds indicated by points p7 and p8, the speeds equal or are below the upper limit speed so that the result of the reverse coasting simulation is adopted as it is without correction.

In the reverse coasting simulation with the point p8 as a starting point, the acceleration during coasting is assumed to be negative. The train decreases in speed in the travel direction in this case. Accordingly, in the reverse coasting simulation the speed rises and exceeds the upper limit speed in the predetermined time increment. Therefore, the position at which the train reaches the upper limit speed is found by interpolation on the basis of the positions and speeds at the points p8 and p9 to correct a result of the reverse coasting simulation (the point p9) to a point (p10) at which the train reaches the upper limit speed. By such correction, a time interval between the point p8 and the point p10 is shorter than the predetermined time increment in the reverse coasting simulation.

Where the acceleration during coasting is also assumed to be negative in a succeeding reverse coasting simulation with the point p10 and a point p12 as starting points, the train also exceeds the upper limit speed at points p11 and p13 after the time increment in the reverse coasting simulation so that the points are corrected to points p12 and p14, respectively, in the same manner as above.

At the position of the point p14, the acceleration is assumed to be zero since the grade is balanced with the running resistance. In this case, the speed of the train after the time increment equals the upper limit speed and remains thereat, whereby a result of the reverse coasting simulation (a value at a point p15) is adopted as it is.

A downgrade is assumed to continue in the travel direction at and after the point p15. In this case, in a section at and after the point p15 the train accelerates by coasting due to an influence of the downgrade and thus lowers in speed again in the reverse coasting simulation. Accordingly, in the section from p15 onward, the train runs at the upper limit speed or slower so that a result of the reverse coasting simulation is adopted without correction. The reverse coasting curve is thus generated by connecting the points p0, p2, p4 to p8, p10, p12, and p14 to p17.

According to the specific example as illustrated above, the reverse curve generator 4 employs the aforementioned method to generate the reverse coasting curve for each speed limit section.

Figure 5:
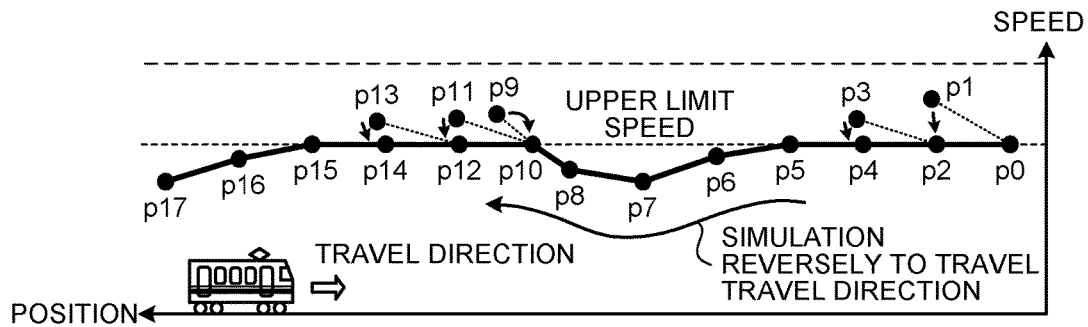
FIG. 5 is an exemplary diagram illustrating a specific example of the method of generating the reverse coasting curve of the first embodiment.

Now, the curve from the point p7 to the point p5 in FIG. 5 described above corresponds to the section in which the train accelerates by coasting due to the downgrade in the travel direction. The train needs to apply brakes in order to run at a constant speed in this section. However, when the train starts coasting from the upper limit speed at the preceding point p10 in the travel direction, the train can decelerate by the amount enough to cancel out the increase in speed from the point p7 to the point p5 before reaching the point p7 due to the influence of the grade and the running resistance. The train continues coasting between the point p7 and the point p5, resulting in returning to the upper limit speed. Accordingly, by such running control, power running and braking can be replaced with coasting with no excess of the upper limit speed to be able to reduce the energy consumption. Note that the generated reverse coasting curve is saved in the running profile generation temporary data 10 and used by the running profile parameter setter 5 in setting a coasting start point.

(Setting Coasting Start Point)

The running profile parameter setter 5 sets the coasting start point in order to reduce the energy consumption and adjust the running time, for the generation of the running profile by the running simulator 6 (to be described). The coasting start point is not set by default. In a running simulation, the running simulator 6 obtains a running profile for the fastest running with no coasting. The running profile parameter setter 5 thereafter sets the coasting start point to gradually increase coasting and adjust the running time in the running simulation to a target running time. The running profile generation device 100 can thus generate the running profile which enables the train to travel in a desired running time with less energy consumption. The running profile parameter setter 5 sets the coasting start point as follows.

When the running profile for the fastest running includes, in a constant-speed running range, a point at which the speed reaches the upper limit speed in the reverse direction to the travel direction (that is, a point such as the point p10 in FIG. 5 at which the speed starts to drop on the reverse coasting curve as viewed in the travel direction), the running profile parameter setter 5 extracts that point (an end point of the constant speed running) as a candidate for the coasting start point. It also extracts a point at which the train shifts from the constant speed running to deceleration from the running profile for the fastest running. The coasting start point is then set at a position that is ahead of the end point of the constant speed running by a certain distance. These settings are made in order to reduce the energy consumption by replacing, with coasting, braking at the beginning of a deceleration section and power running at the end of a constant-speed section.

The running profile parameter setter 5 also extracts, from a downgrade section of the running profile for the fastest running, a shifting point from acceleration to constant-speed running or a shift point from acceleration to deceleration, and sets the coasting start point at a position that is ahead of the end point of acceleration by a certain distance. This setting is made in order to reduce the energy consumption by replacing, with coasting, braking at the beginning of the constant-speed running and power running at the end of an acceleration section.

The coasting start point is set on the running profile for the fastest running as described above to gradually increase coasting and repeat the running simulation for the running profile adjustment until the running time equals the target running time. In the present embodiment, the coasting start points as a parameter ahead of the end point of the constant-speed section and ahead of the end point of acceleration are set to extend the coasting section from the end point of the constant-speed running and the acceleration end point by a certain amount of change, respectively. The coasting start point information set by the running profile parameter setter 5 is saved in the running profile generation temporary data 10.

(Running Simulation)

The running simulator 6 performs the running simulation to generate the running profile. The running simulation proceeds forward relative to the travel direction from a station of departure as the base point up to a next station, referring to the running profile generation range, the speed limit information of the running profile generation range, each reverse curve (the reverse deceleration curve, the reverse acceleration curve and the reverse coasting curve) and the coasting start point information saved in the running profile generation temporary data 10 as well as the vehicle performance (such as power running characteristics and braking characteristics) and the route information (the grade and curve information on the route) that are saved in the vehicle performance and route information database 9.

Figure 6:
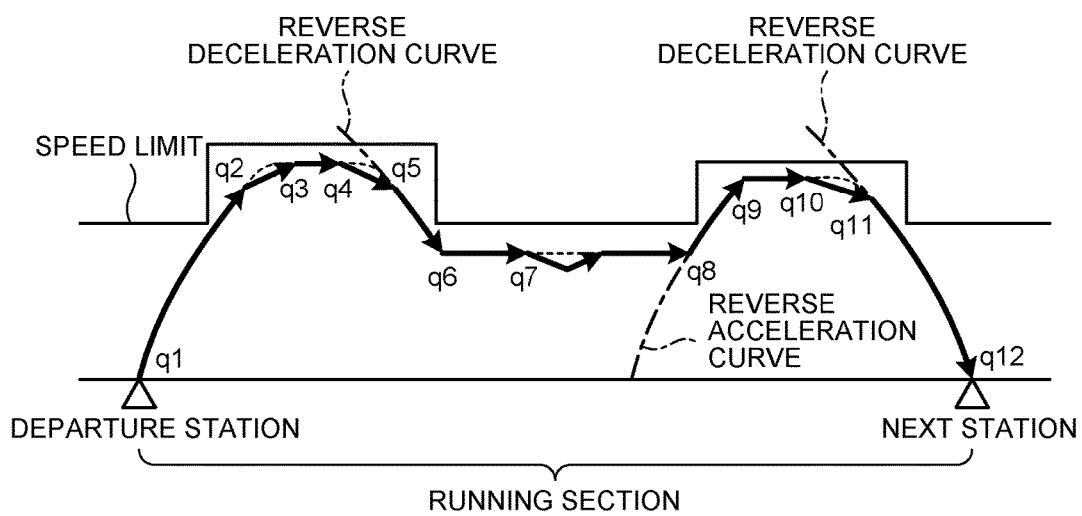
FIG. 6 is an exemplary diagram illustrating a specific example of a method of a running simulation of the first embodiment.

Here, a specific example of the running simulation will be described with reference to FIG. 6. The following is an example of a virtual train operation in the running simulation.

The train runs on power with a predetermined notch from a station of departure q1 and accelerates up to the upper limit speed of the corresponding speed limit section. When the end point of an acceleration section is on a downgrade, a coasting start point q2 is set before the end point of the acceleration section in some cases as described above. In such case, the train starts coasting from the coasting start point q2 and accelerates by coasting. The train then shifts to constant-speed running upon accelerating and reaching the upper limit speed (q3).

When a coasting start point q4 is set ahead of the end point of a constant-speed running section preceding a deceleration section, the train starts coasting from the coasting start point q4 and decelerates by coasting. The train applies brakes when a speed curve intersects a reverse deceleration curve while coasting (q5), then decelerates until reaching a deceleration end position being a base point of the reverse deceleration curve. The train shifts to constant-speed running after decelerating up to a deceleration end position q6.

When a coasting start point q7 is set in the middle of the constant-speed running, the train starts coasting from the coasting start point q7 to decelerate by coasting and then accelerate by coasting. The train continues coasting until returning to the upper limit speed and shifts to constant-speed running upon reaching the upper limit speed.

When the speed curve intersects a reverse acceleration curve (q8) during constant-speed running, the train accelerates up to the upper limit speed of a next speed limit section. The train then shifts to constant-speed running once the speed of the train reaches the upper limit speed (q9). The train starts coasting to decelerate by coasting upon reaching a coasting start point q10 in the middle of the constant-speed running. When the speed curve of the running simulation thereafter intersects, while coasting, a reverse deceleration curve aimed for stopping at a next station (q11), the train applies brakes and decelerates until coming to a stop at a stop position (q12) of the next station.

The running profile generation device 100 of the present embodiment generates the running profile utilizing coasting based on such running simulation performed by the running simulator 6. The generated running profile is saved in the running profile generation temporary data 10.

The running simulation result determiner 7 evaluates a running time on the running profile generated by the running simulator 6 to determine whether the running time on the running profile is equal to a target running time during a station interval concerned. When determining that the running time equals the target running time, the running simulation result determiner 7 adopts the running profile as a running profile to be actually used and transmits it to the running profile data output unit 8. On the other hand, when determining that the running times are not equal to each other, such as when the running time still has a margin with respect to the target running time, the running simulation result determiner 7 requests the running profile parameter setter 5 to extend the coasting section. The running simulation result determiner 7 then sets a new coasting start point, so that the running profile generation manager 1 causes the running simulator 6 to perform a running simulation under the new setting. When the running time exceeds the target running time, the running simulation result determiner 7 adopts the generated running profile realizing a run within the target running time as the running profile to be actually used before extending the coasting section.

The running profile data output unit 8 outputs, to the outside via the running profile generation manager 1, running profile data on the adopted running profile to be actually used by the determination by the running simulation result determiner 7, the running profile data including data on a speed and a position at each time point. The running profile data is displayed on a screen or output as numerical data to be utilized in actual train operation as the running profile which enables the train to run in a specified running time with less power consumption.

The vehicle performance and route information database 9 holds the vehicle performance (the power running characteristics and braking characteristics), the route information (the grade and curve information), the speed limit information on an entire route, and the like.

The running profile generation temporary data 10 includes a memory and holds various kinds of data including the running profile generation range set by the running section condition setter 2, the speed limit information on the running profile generation range set by the speed limit information setter 3, each reverse curve generated by the reverse curve generator 4, the coasting start point information set by the running profile parameter setter 5, and the running profile generated by the running simulator 6.

Figure 7A:
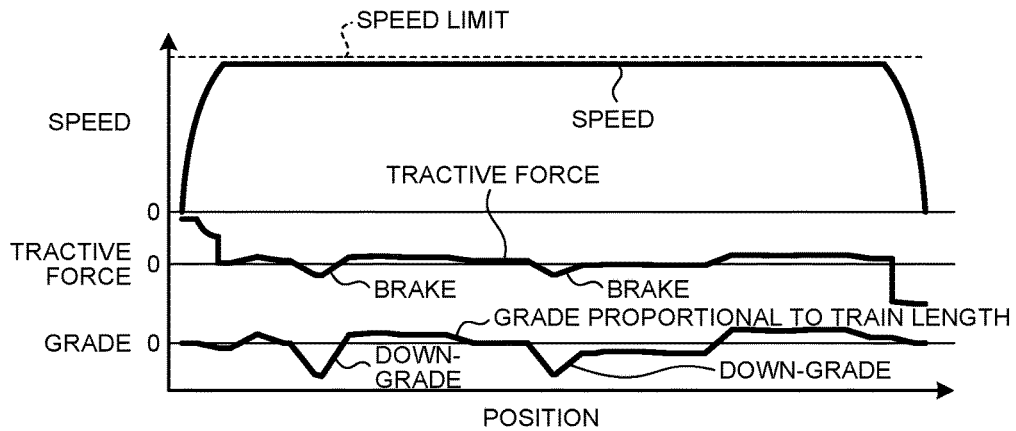
FIG. 7A is an exemplary diagram illustrating an example of a running profile for train running during a station interval concerned in a target running time only by acceleration, constant-speed running, and deceleration with no coasting section set.
Figure 7B:
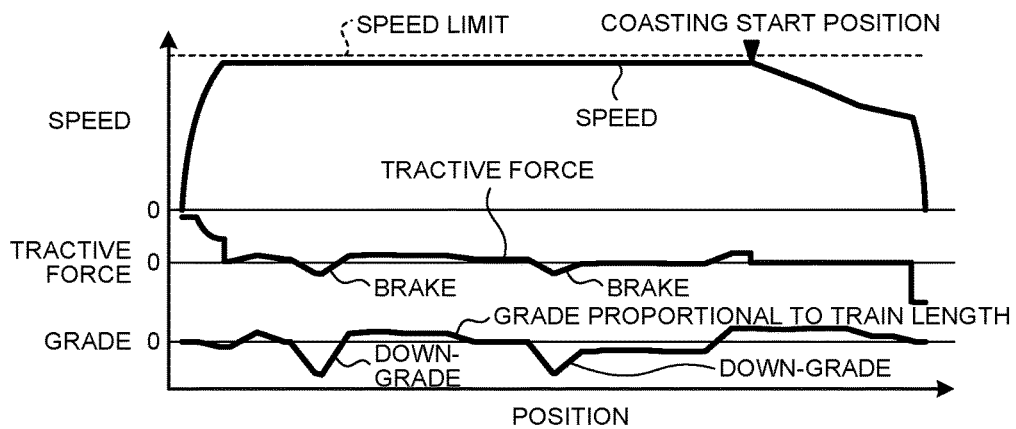
FIG. 7B is an exemplary diagram illustrating an example of adjusted running profile in which a running speed in a constant-speed running section is set as an upper limit speed according to a speed limit, and a coasting section is set before a deceleration section so as to set the same running time as that in FIG. 7A.
Figure 7C:
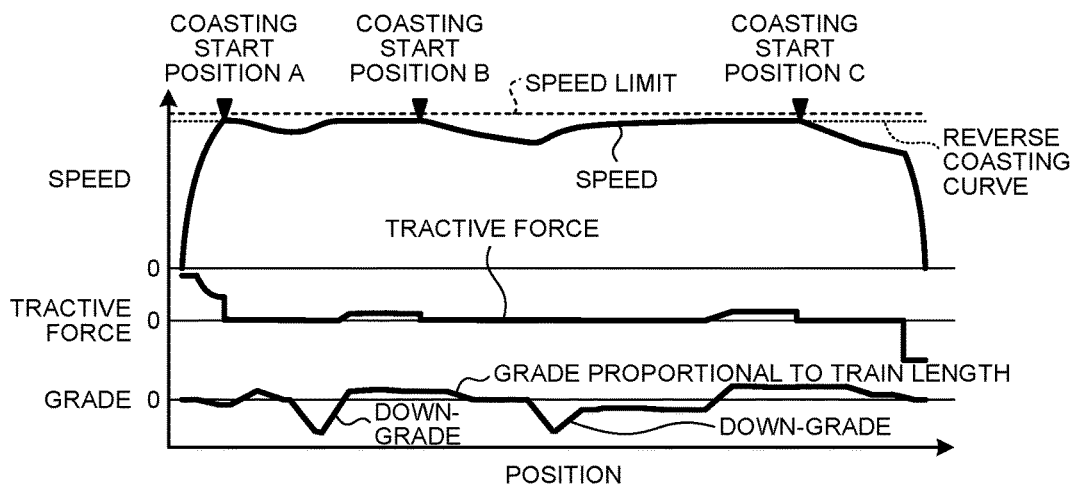
FIG. 7C is an exemplary diagram illustrating a running profile generated by a running profile generation device of the first embodiment.

Next, FIGS. 7A to 7C will be referred to, to describe an effect of reducing the power consumption when a train runs following the running profile generated by the running profile generation device 100 that has the aforementioned configurations and functions. The running time is the same among FIGS. 7A to 7C.

FIG. 7A illustrates a running profile for a train when running between a station interval concerned in the target running time only by acceleration, constant-speed running, and deceleration without a coasting section set. A constant-speed running section includes a downgrade section, in which the train applies brakes to maintain a constant speed.

FIG. 7B illustrates an adjusted running profile including a constant-speed running section for which a running speed of the train is set as an upper limit speed according to a speed limit and including a coasting section ahead of a deceleration section, in order to set the same running time as that in FIG. 7A. The train applies brakes during constant-speed running as in FIG. 7A.

FIG. 7C illustrates a running profile generated by the running profile generation device 100 of the present embodiment. The train is prevented from applying brakes during constant-speed running by appropriately setting the coasting start point not only before the deceleration section but also at a plurality of positions in the middle of the constant-speed running section with use of the reverse coasting curve. In order to adjust the running time to the target running time, in the present example, the coasting section is set at the end of the constant-speed running section before the deceleration section in addition to the coasting during the constant-speed running. Thus, the running time can also be adjusted by setting the coasting section at the end of the constant-speed running section before the deceleration section.

Comparing these running profiles, the energy consumption in FIG. 7B is reduced by 7.9% from that in FIG. 7A, and the energy consumption in FIG. 7C is reduced by 13.2% from that in FIG. 7A. Regenerated power is taken into account in calculating the energy consumption, where net energy consumption from which the regenerated power is subtracted is used in the comparison. Accordingly, the running profile generation device 100 of the present embodiment can generate a running profile with further reduced energy consumption than that of a conventional running profile utilizing coasting, by appropriately setting the coasting section in the middle of constant-speed running in addition to the coasting before the deceleration section.

The reverse coasting curve is indicated by a dotted line in FIG. 7C. The running profile parameter setter 5 extracts the point at which the running speed reaches the upper limit speed from therebelow on the reverse coasting curve (in the travel direction, the point at which the speed starts to drop from the upper limit speed) and sets the extracted point as the coasting start point in the present embodiment. However, a similar result can be obtained by the running simulation in which the train starts coasting once the running speed exceeds the reverse coasting curve in the corresponding speed limit section and shifts to constant-speed running when reaching the upper limit speed again after a decrease in the running speed. Moreover, in the running simulation, when the insertion of the coasting at the coasting start point into the constant-speed running causes the running time to exceed the target running time, the coasting start point is set at a position after the point (p10 in FIG. 5) at which the train starts dropping from the upper limit speed and before the point (p7 in FIG. 5) at which acceleration shifts from negative to positive in the travel direction on the reverse coasting curve. Thereby, not all but a part of the braking operations can be avoided, preventing a large drop in the speed.

The running profile generation device 100 of the present embodiment described above can generate the running profile with reduced energy consumption since it can easily insert the coasting section into the middle of constant-speed running section.

Second Embodiment

Figure 8:
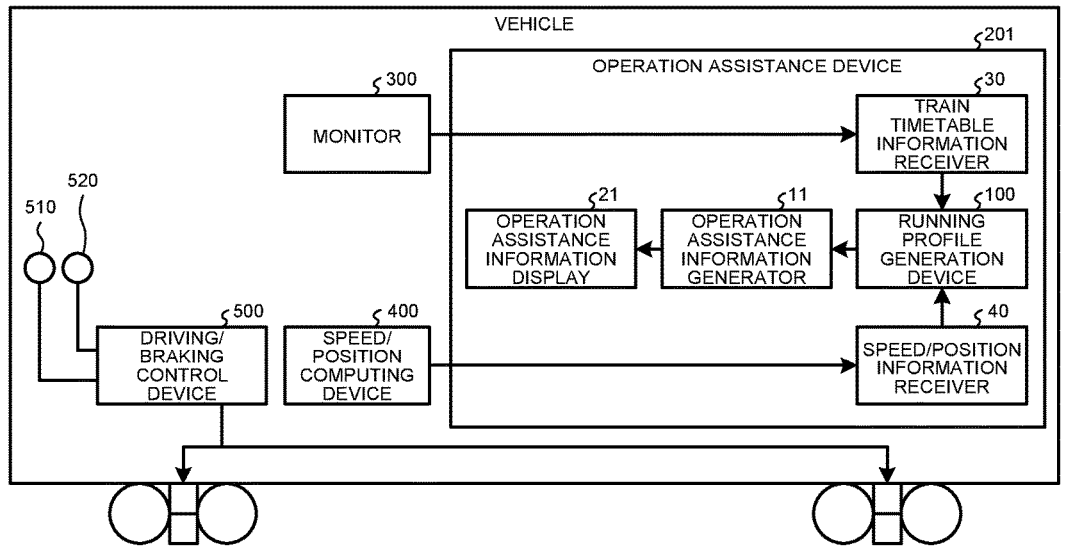
FIG. 8 is an exemplary block diagram illustrating a functional configuration of an operation assistance device according to a second embodiment.

A second embodiment will now be described with reference to FIG. 8. In the present embodiment, an operation assistance device 201 equipped with a running profile generation device 100 (described above) is installed on a train and generates a running profile according to a running condition that changes every moment. Thereby, the train can run as scheduled on the train timetable while reducing energy consumption even when an actual run of the train deviates from the generated running profile.

The operation assistance device 201 includes an operation assistance information generator 11, an operation assistance information display 21, a train timetable information receiver 30 and a speed and position information receiver 40 in addition to the running profile generation device 100.

The configuration and operation of the running profile generation device 100 are similar to those of the running profile generation device 100 of the first embodiment. Description of the running profile generation device 100 will thus be omitted. However, the running profile generation device 100 herein generates a running profile for a current running section from the current position of a train as a departure point to an arrival point according to a current speed and the current position of the train acquired from the speed and position information receiver 40.

On the basis of the running profile generated according to the current speed and current position of the train, the operation assistance information generator 11 extracts a target speed at the moment and generates operation assistance information including information on such as the extracted target speed or a target running operation (power running operation and braking operation) based on the target speed.

The operation assistance information display 21 presents the operation assistance information generated by the operation assistance information generator 11 to an operator. In the present embodiment, the operator operates a power running handle 510 or a brake handle 520 on the basis of the operation assistance information presented by the operation assistance information display 21 to control the running train based on the running profile generated by the running profile generation device 100.

The train timetable information receiver 30 acquires train timetable information on the train equipped with the operation assistance device 201. The train timetable information can be acquired from a monitor 300 storing IC card information fed by the operator, for example, as the conventional monitor. When the train timetable information is not managed by an existing device on the train, the operation assistance device 201 is adapted to include a recorder (not shown) for the train timetable information and a train timetable information input interface (not shown) to receive the train timetable information. Moreover, when the train timetable information contains a running section and a running time set for the running section, sections and running times for the sections may be recorded as the train timetable information instead of time-based train timetable information. The monitor 300 may also be configured as a display that performs display by the operation assistance information display 21.

The speed and position information receiver 40 acquires speed and position information of the train. The speed information refers to a speed which is usually measured by a tacho-generator (not shown), for example, included in a train vehicle. The position information is acquired by receiving, with a position information detector (not shown) on the train, absolute position information from a transponder installed on the ground and adding to the absolute position information a distance traveled that is obtained by a multiplication between the speed and the running time. The speed/position information receiver 40 is adapted to be able to receive the speed and position information and compute the position of the running train.

Note that the speed and position information may be already computed by an automatic train control (ATC) device, for example, in which case the speed and position information may be received from the automatic train control device. Alternatively, the speed and position information receiver 40 may be adapted to function as a speed and position computing device 400 or the automatic train control device computing the speed and position information. The operation assistance device 201 can also be formed of a general computer device besides a specific hardware device. When the general computer device is used, the processing and functions of the respective elements described above are implemented as the functions by a CPU, a display, a storage, a control program stored in the storage and executed by the CPU and an input/output interface that are included in the computer device.

The operation assistance device 201 includes the train timetable information receiver 30 and the speed and position information receiver 40, whereby the running profile generation device 100 in the operation assistance device 201 can generate the running profile based on an actual running condition of the train that changes every moment as well as on the train timetable information. Therefore, when a gap occurs between the running profile generated in advance and the actual running condition, the train can compute and generate in real time the running profile which enables the train to run as scheduled on the train timetable with reduced power consumption. Moreover, the operation assistance information based on the real-time running profile is displayed on the screen of the operation assistance information display 21. Thus, the operator can operate the power running handle 510 and the brake handle 520 on the basis of the displayed operation assistance information to control a driving and braking control device 500 and operate the train, whereby the train can be operated as scheduled on the train timetable with reduced power consumption.

Third Embodiment

Figure 9:
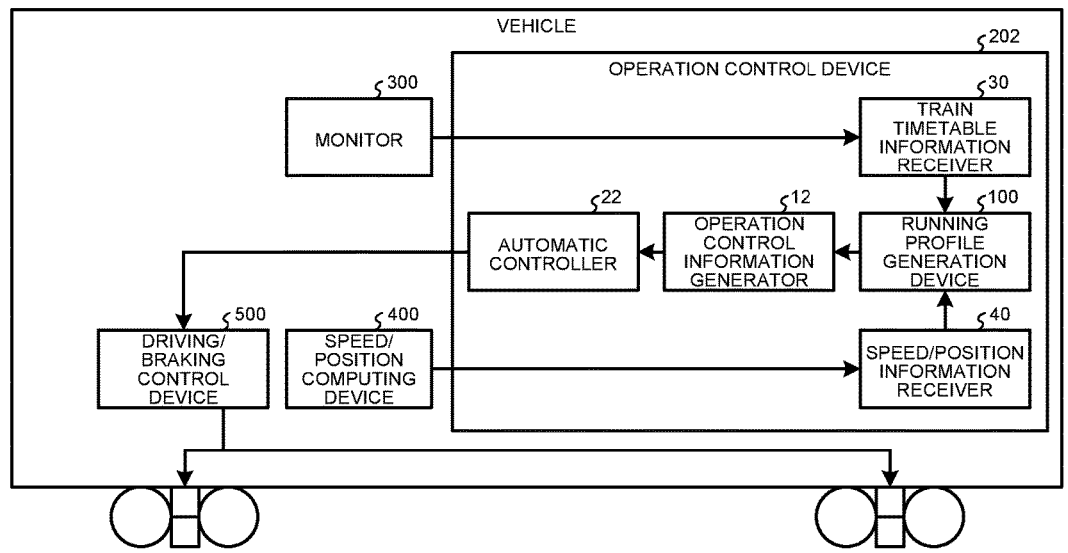
FIG. 9 is an exemplary block diagram illustrating a functional configuration of an operation control device according to a third embodiment.

A third embodiment will now be described with reference to FIG. 9. In the present embodiment, an operation control device 202 equipped with a running profile generation device 100 is installed on a train and generates a running profile according to a running condition that changes every moment, thereby realizing automatic train running as scheduled on a train timetable with reduced energy consumption even when an actual run deviates from the generated running profile.

The operation control device 202 includes the running profile generation device 100, an operation control information generator 12, an automatic controller 22, a train timetable information receiver 30, and a speed and position information receiver 40. In the present embodiment, the configuration and operation of the running profile generation device 100 are similar to those in the first embodiment, while the configuration and operation of each of the train timetable information receiver 30 and the speed and position information receiver 40 are similar to those in the second embodiment. The present embodiment is characterized in that the operation control information generator 12 and the automatic controller 22 are provided in place of the operation assistance information generator 11 and the operation assistance information display 21 provided in the operation assistance device 201 of the second embodiment. What is common to the aforementioned embodiments will not be described below.

The operation control information generator 12 determines a control command (a power running notch or brake notch) at the moment on the basis of a running profile generated by the running profile generation device 100, generates running control information including the determined control command, and outputs the information to the automatic controller 22. Note that the operation control information generator 12 may also be adapted to acquire a command value of a power running command or a brake command for a non-coasting section and generate the operation control information on the basis of the command value calculated by the running simulator 6.

The automatic controller 22 transmits the control command to a driving and braking control device 500 of the train as needed according to the operation control information generated by the operation control information generator 12, to automatically control the train. The driving and braking control device 500 controls a driving and braking controller (not shown) of the train according to the control command from the automatic controller 22. Thus, the running train is automatically controlled. When the train includes an ATO (Automatic Train Operation) separately from the operation control device 202, the ATO may be notified of the running profile generated by the running profile generation device 100 to determine the control command for the driving and braking control device 500. In this case, the operation control information generator 12 and the automatic controller 22 can be omitted.

Note that the operation control device 202 can be formed of a general computer device, for example, besides a dedicated hardware device. With use of the general computer device, the processing and functions of the respective elements described above are implemented as the functions by a CPU, a storage, a control program stored in the storage and executed by the CPU and an input/output interface that are included in the computer device.

In the present embodiment, the operation control information generator 12 and the automatic controller 22 transmit the control command based on a travel plan generated by the running profile generation device 100 directly to the driving and braking control device 500 to automatically control the running of the train, which makes it possible to reduce an influence of a delay or an error caused by an operator and at the same time to automatically and easily operate the train on time based on the train timetable with reduced power consumption.

The running profile generation device, the operation assistance device, and the operation control device as described in the first to third embodiments can allow the train to run in a predetermined running time in a section predefined by the train schedule with reduced energy consumption.

While several embodiments of the present invention have been described, these embodiments have been illustrated by way of example and are not intended to limit the scope of the invention. These novel embodiments can be implemented in various other modes and be subjected to various omissions, substitutions and modifications without departing from the gist of the invention. These embodiments and variations thereof are included in the scope and gist of the invention as well as in the inventions described in claims and its equivalents.

The invention claimed is:

1. A running profile generation device comprising:
   a storage that stores speed limit information, vehicle performance information of a vehicle, and route information; and
   a processor which is configured to:
   acquire, from the storage, at least one speed limit section of a running section being set based on a departure point and an arrival point of the running section, the speed limit section being a section delimited at positions at which a speed limit changes;
   determine a base point based on a terminal position and an upper limit speed of the speed limit section and generate a reverse coasting curve from the base point based on the vehicle performance information and the route information stored in the storage, the upper limit speed being set according to a speed limit for the speed limit section;
   determine a coasting start position based on the generated reverse coasting curve;
   generate a running profile by performing a running simulation based on the set running section, the speed limit information on the running section, the generated reverse coasting curve, the set coasting start position, and the vehicle performance information and the route information stored in the storage; and
   output the generated running profile to control running of the vehicle,
   wherein the processor sets a range below the upper limit speed as a coasting range and sets a range equal to or above the upper limit speed to the upper limit speed during coasting from the base point toward the departure point.

2. The running profile generation device according to claim 1, wherein the processor computes a speed at a plurality of positions sequentially from the base point toward the departure point based on the vehicle performance information and the route information stored in the storage and, every time the computed speed equals or exceeds the upper limit speed, sets the speed at a certain position to the upper limit speed.

3. The running profile generation device according to claim 1, wherein the processor sets, as the coasting start position, a shift position from the range set to the upper limit speed to the coasting range when tracing the reverse coasting curve from the departure point to the arrival point.

4. An operation assistance device comprising:
   a storage that stores speed limit information, vehicle performance information of a vehicle, and route information;
   a processor which is configured to:
   receive current speed and position information of the vehicle;
   acquire, from the storage, at least one speed limit section of a running section being set based on a departure point and an arrival point of the running section, the speed limit section being a section delimited at positions at which a speed limit changes, the departure point being set at a current position obtained from the speed and position information receiver;
   determine a base point based on a terminal position and an upper limit speed of the speed limit section and generate a reverse coasting curve from the base point based on the vehicle performance information and the route information stored in the storage, the upper limit speed being set according to a speed limit for the speed limit section;
   determine a coasting start position based on the generated reverse coasting curve;
   generate a running profile by performing a running simulation with use of the set running section, the speed limit information on the running section, a received current speed, the generated reverse coasting curve, the set coasting start position, and the vehicle performance information and the route information stored in the storage;
   extract a target speed from the generated running profile and generate information on the target speed or target operation to achieve the target speed; and
   output the generated running profile to control running of the vehicle; and
   an operation assistance information display that presents to an operator the generated information on the target speed or target operation to achieve the target speed,
   wherein the processor sets a range below the upper limit speed as a coasting range and sets a range equal to or above the upper limit speed to the upper limit speed during coasting from the base point toward the departure point.

5. An operation control device comprising:
a storage that stores speed limit information, vehicle performance information of a vehicle, and route information;
a processor which is configured to:
  receive current speed and position information;
  acquire, from the storage, at least one speed limit section of a running section being set based on a departure point and an arrival point of the running section, the speed limit section being a section delimited at positions at which a speed limit changes, the departure point being set at a current position obtained from the speed and position information receiver;
  determine a base point based on a terminal position and an upper limit speed of the speed limit section and generate a reverse coasting curve from the base point based on the vehicle performance information and the route information stored in the storage, the upper limit speed being set according to a speed limit for the speed limit section;
determine a coasting start position based on the generated reverse coasting curve;
generate a running profile by performing a running simulation with use of the set running section, the speed limit information on the running section, a received current speed, the generated reverse coasting curve, the set coasting start position, and the vehicle performance information and the route information stored in the storage;
extract a target speed from the running profile generated by the simulator and generate operation control information to achieve the target speed; and
control a driving and braking device of the vehicle based on the generated operation control information to control running of the vehicle,
wherein the processor sets a range below the upper limit speed as a coasting range and sets a range equal to or above the upper limit speed to the upper limit speed during coasting from the base point toward the departure point.

6. A running profile generation method comprising:
acquiring from a storage at least one speed limit section of a running section being set based on a departure point and an arrival point, the speed limit section being a section delimited at positions at which a speed limit changes;
determining a base point based on a terminal position and an upper limit speed of the speed limit section to generate a reverse coasting curve from the base point using vehicle performance information of a vehicle and route information stored in the storage, and setting a range below the upper limit speed as a coasting range and setting a range equal to or above the upper limit speed to the upper limit speed during coasting from the base point toward the departure point, the upper limit speed being set according to a speed limit for the speed limit section;
determining a coasting start position based on the generated reverse coasting curve;
generating a running profile by performing a running simulation based on the set running section, speed limit information on the running section, the generated reverse coasting curve, the set coasting start position, and the vehicle performance information and the route information stored in the storage; and
outputting the generated running profile to control running of the vehicle.

* * * * *